United States Patent
Yuse et al.

(10) Patent No.: US 8,884,781 B2
(45) Date of Patent: Nov. 11, 2014

(54) TERMINAL APPARATUS MOUNTED ON A VEHICLE TO PERFORM VEHICLE-TO-VEHICLE COMMUNICATION

(75) Inventors: Yoshio Yuse, Sumoto (JP); Yuki Yorifuji, Tottori (JP); Makoto Nagai, Kakamigahara (JP)

(73) Assignee: Sanyo Electric Co., Ltd., Osaka (JP)

( * ) Notice: Subject to any disclaimer, the term of this patent is extended or adjusted under 35 U.S.C. 154(b) by 106 days.

(21) Appl. No.: 13/489,873

(22) Filed: Jun. 6, 2012

(65) Prior Publication Data

US 2012/0268295 A1     Oct. 25, 2012

Related U.S. Application Data

(63) Continuation of application No. PCT/JP2011/003014, filed on May 30, 2011.

(30) Foreign Application Priority Data

May 31, 2010  (JP) .................................. 2010-125035
May 31, 2010  (JP) .................................. 2010-125036

(51) Int. Cl.
        *G08G 1/09*           (2006.01)
(52) U.S. Cl.
        USPC ....... 340/905; 340/902; 340/995.13; 701/301
(58) Field of Classification Search
        USPC ............ 340/905, 990, 995.13, 435, 436, 902;
                        701/22, 23, 207, 209, 301, 411, 36,
                        701/116, 45, 117
        See application file for complete search history.

(56) References Cited

U.S. PATENT DOCUMENTS

| | | | |
|---|---|---|---|
| 6,591,186 B1 | 7/2003 | Seki et al. | |
| 6,862,524 B1 * | 3/2005 | Nagda et al. | 701/420 |
| 7,610,146 B2 * | 10/2009 | Breed | 701/514 |

(Continued)

FOREIGN PATENT DOCUMENTS

| | | |
|---|---|---|
| CN | 1335929 A | 2/2002 |
| CN | 101046920 A | 10/2007 |

(Continued)

OTHER PUBLICATIONS

International Search Report, and English translation thereof, issued in International Patent Application No. PCT/JP2011/003014 dated Aug. 9, 2011.

(Continued)

*Primary Examiner* — Hung T. Nguyen
(74) *Attorney, Agent, or Firm* — McDermott Will & Emery LLP

(57) ABSTRACT

A map data storage unit holds map data in which a road ID is allocated, as identification information, to every preset section of at least part of roads. A traffic jam determination unit determines whether the section corresponding to every road ID is congested. A transmission unit performs broadcast transmission of vehicle data including a road ID and the traveling speed of a vehicle from the vehicle traveling in each section of a road. At the time, the transmission unit forms a frame in which the received vehicle data of other vehicle and the vehicle data of a driver's vehicle are combined. An information compressing unit compresses an amount of data by deleting the traveling speed from the frame with respect to a section that has been determined not to be congested by the traffic jam determination unit.

7 Claims, 12 Drawing Sheets

(56) References Cited

U.S. PATENT DOCUMENTS

| | | |
|---|---|---|
| 7,680,588 B2 | 3/2010 | Tsukamoto |
| 8,255,537 B2 | 8/2012 | Hamada et al. |
| 8,423,279 B2* | 4/2013 | Kitagawa et al. ............. 701/301 |
| 2009/0140887 A1* | 6/2009 | Breed et al. ................... 340/990 |

FOREIGN PATENT DOCUMENTS

| | | |
|---|---|---|
| CN | 101611434 A | 12/2009 |
| JP | 2006-072472 A | 3/2006 |
| JP | 2007-280220 A | 10/2007 |
| JP | 2008-070261 A | 3/2008 |
| JP | 2009-188527 A | 8/2009 |
| JP | 2009-199222 A | 9/2009 |
| JP | 2009-217376 A | 9/2009 |

OTHER PUBLICATIONS

International Preliminary Examination Report received in related Int'l Application No. PCT/JP2011/003014, mailed Dec. 13, 2012.

English translation of Chinese Office Action issued in Chinese Application No. 201180003374.3 dated Sep. 18, 2013.

* cited by examiner

FIG.4

| ROAD-TO-VEHICLE TRANSMISSION PERIOD | PERIOD OF PRIORITY | GENERAL PERIOD |
|---|---|---|

FIG.9

| DRIVER'S VEHICLE DATA | | OTHER VEHICLE DATA | | OTHER VEHICLE DATA | |
|---|---|---|---|---|---|
| ROAD ID | TRAVELING SPEED | ROAD ID | TRAVELING SPEED | ROAD ID | TRAVELING SPEED |

TERMINAL APPARATUS MOUNTED ON A VEHICLE TO PERFORM VEHICLE-TO-VEHICLE COMMUNICATION

RELATED APPLICATIONS

This is a continuation of PCT International Application PCT/JP2011/003014 filed on May 30, 2010, which claims priority to Japanese Patent Application Nos. 2010-125035 filed on May 31, 2010, and 2010-125036filed on May 31, 2010. The disclosures of these applications including the specifications, the drawings, and the claims are hereby incorporated by reference in their entirety.

BACKGROUND OF THE INVENTION

1. Field of the Invention

The present invention relates to a technique in which presence or absence of a traffic jam is determined in an on-vehicle terminal apparatus.

2. Description of the Related Art

Consideration of road-to-vehicle communications is underway to prevent encounter head traffic accidents at intersections. In the road-to-vehicle communication, information on the situations of an intersection are communicated between a road-side device and on-vehicle equipment. In the road-to-vehicle communication, it becomes necessary to install the road-side devices, which requires a large effort and high cost. On the other hand, a system is to be established in which a traffic jam is predicted by vehicle-to-vehicle communication, such as ITS (Intelligent Transport Systems). In the vehicle-to-vehicle communication, i.e., in a mode in which information are communicated between the on-vehicle equipments, it is not necessary to install the road-side devices.

In Japanese Patent Application Publication No. 2009-188527, it is disclosed that, in a vehicle-to-vehicle communication apparatus, vehicles that exist around the most nearby intersection and travel in the same direction as those of a driver's vehicle are defined as the same vehicle group as the driver's vehicle, and the transmission period in a representative vehicle of the same vehicle group is made short and the transmission period in the vehicles other than the representative vehicle is made long. Thereby, an increase in the communication traffic between the vehicles of the same vehicle group can be suppressed.

SUMMARY OF THE INVENTION

When the vehicle-to-vehicle communication is adopted, there is the possibility that each on-vehicle equipment may receive, depending on a traffic situation, other vehicle information from several tens to hundreds of vehicles, resulting in huge communication traffic. Accordingly, it is required to reduce an amount of transmission data by saving only the information useful for determining a traffic jam with each on-vehicle equipment and eliminating unnecessary information.

The present invention has been made in view of these situations, and a purpose of the invention is to provide a terminal apparatus suitable for determining presence or absence of a traffic jam based on vehicle-to-vehicle communication.

One aspect of the present invention discloses a terminal apparatus to be mounted on a vehicle to perform vehicle-to-vehicle communication. The terminal apparatus transmits vehicle data of a driver's vehicle including both a road ID of a road on which the driver's vehicle is traveling and traveling speed, by referring to map data in which a road ID is allocated, as identification information, to every preset section of at least part of roads.

Note that any combination of the aforementioned components or any manifestation of the present invention realized by modifications of a method, device, system, storing media, computer program, and so forth, is effective as an embodiment of the present invention.

BRIEF DESCRIPTION OF THE DRAWINGS

Embodiments will now be described, by way of example only, with reference to the accompanying drawings, which are meant to be exemplary, not limiting, and wherein like elements are numbered alike in several figures, in which:

FIG. 4 is a view illustrating the structure of a sub-frame;

FIG. 9 is a view illustrating the basic structure of a frame to be transmitted or received in the vehicle-to-vehicle communication;

DETAILED DESCRIPTION OF THE INVENTION

Figure 1:
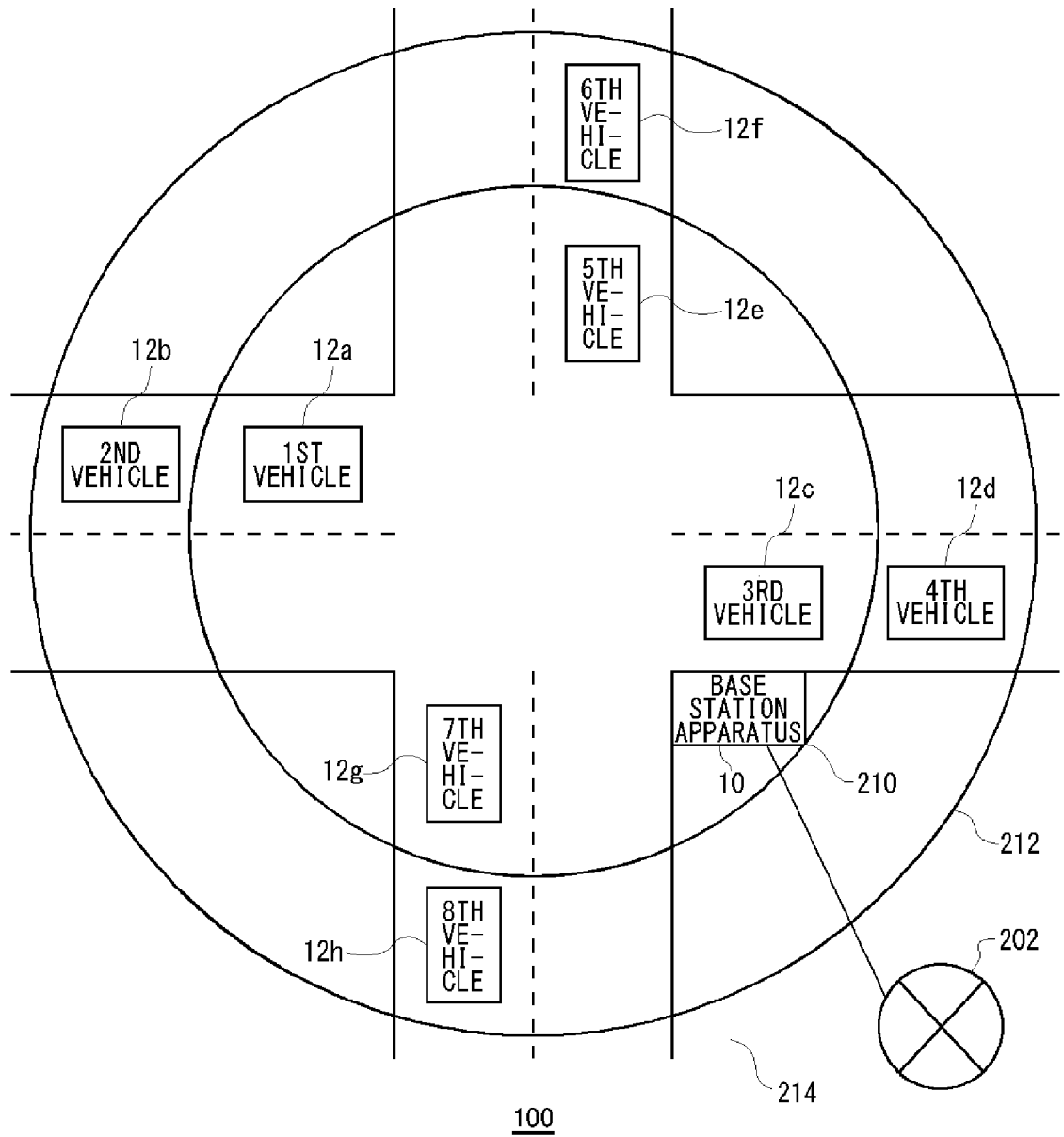
FIG. 1 is a view illustrating the structure of a communication system in which vehicle-to-vehicle communication and road-to-vehicle communication are performed.

Prior to describing the present invention, a communication system will be described in which vehicle-to-vehicle communication is performed between terminal apparatuses mounted on vehicles and road-to-vehicle communication is also performed from a base station apparatus installed in an intersection, etc., to the terminal apparatuses.

In this communication system, a terminal apparatus performs broadcast transmission of a packet signal in which information on the speed and location, etc., of a vehicle (hereinafter, these will be referred to as "data") are stored as the vehicle-to-vehicle communication. Other terminal apparatuses receive the packet signal and recognize approach of the vehicle, etc., based on the data. The base station apparatus repeatedly specifies frames including a plurality of sub-frames as the road-to-vehicle communication. The base station apparatus selects any one of the plurality of sub-frames to perform, during a period of the leading portion of the selected sub-frame, broadcast transmission of a packet signal in which control information, etc., are stored.

The control information includes information on a period during which the base station apparatus performs broadcast transmission of a packet signal (hereinafter, referred to as a "road-to-vehicle transmission period"). The terminal apparatus specifies the road-to-vehicle transmission period based on the control information and transmits a packet signal during a period other than the road-to-vehicle transmission period. Thus, the road-to-vehicle communication and vehicle-to-vehicle communication are time division multiplexed, and hence the probability that the packet signals from the two apparatuses may collide with each other can be reduced. That is, interference between the road-to-vehicle communication and vehicle-to-vehicle communication can be reduced by the terminal apparatus recognizing the content of the control information. Areas in which the terminal apparatuses performing the vehicle-to-vehicle communication exist are sorted out mainly into three types.

One of the three types is an area to be formed around the base station apparatus (hereinafter, referred to as a "first area"), another is an area to be formed outside the first area (hereinafter, referred to as a "second area"), and the other is an area to be formed outside the second area (hereinafter, referred to as an "outside second area"). Herein, in the first and second areas, the terminal apparatus can receive, at a certain level of quality, the packet signal from the base station apparatus; on the other hand, in the outside second area, the terminal apparatus cannot receive, at a certain level of quality, the packet signal therefrom. The first area is formed to be nearer to the center of an intersection than the second area. Because a vehicle that exists in the first area is located near to an intersection, it can be said that a packet signal from the terminal apparatus mounted on the vehicle is important in terms of suppressing a collision accident.

Corresponding to such specification of areas, a period during which the vehicle-to-vehicle communication is performed (hereinafter, referred to as a "vehicle-to-vehicle transmission period") is formed by time division multiplexing a period of priority and a general period. The period of priority is one used by a terminal apparatus that exists in the first area, during which the terminal apparatus transmits a packet signal in any one of a plurality of slots forming the period of priority. The general period is one used by a terminal apparatus that exists in the second area, during which the terminal apparatus transmits a packet signal in the CSMA method. A terminal apparatus that exists in the outside second area transmits a packet signal in the CSMA method, irrespective of the structure of a frame. Herein, it is determined which area a terminal apparatus mounted on a vehicle exists in.

FIG. 1 illustrates the structure of a communication system 100 as stated above. This view can be obtained by seeing an intersection from above. The communication system 100 comprises: abase station apparatus 10, a first vehicle 12a, a second vehicle 12b, a third vehicle 12c, a fourth vehicle 12d, a fifth vehicle 12e, a sixth vehicle 12f, a seventh vehicle 12g, and an eighth vehicle 12h, which are collectively referred to as a vehicle 12; and a network 202. A non-illustrated terminal apparatus is mounted on each vehicle 12. A first area 210 is formed around the base station apparatus 10, a second area 212 is formed outside the first area 210, and an outside second area 214 is formed outside the second area 212.

As illustrated, a road running in the horizontal direction, i.e., in the left-right direction in the view and that running in the vertical direction, i.e., in the up-down direction in the view, intersect with each other at the center portion. Herein, the upper side in the view corresponds to the "North" direction, the left side to the "West" direction, the lower side to the "South" direction, and the right side to the "East" direction. The portion where the two roads intersect with each other is an "intersection". The first vehicle 12a and second vehicle 12b are traveling from left to right, and the third vehicle 12c and fourth vehicle 12d are traveling from right to left. The fifth vehicle 12e and sixth vehicle 12f are traveling from up to down, and the seventh vehicle 12g and eighth vehicle 12h are traveling from down to up.

In the communication system 100, the base station apparatus 10 is arranged at an intersection. The base station apparatus 10 controls the communication between terminal apparatuses. The base station apparatus 10 repeatedly generates, based on both a signal received from a non-illustrated GPS satellite and a frame formed by another non-illustrated base station apparatus 10, frames each including a plurality of sub-frames. Herein, it is specified that a road-to-vehicle transmission period can be set in the leading portion of each sub-frame. Of the plurality of sub-frames, the base station apparatus 10 selects a sub-frame in which a road-to-vehicle transmission period is not set by another base station apparatus 10. The base station apparatus 10 sets a road-to-vehicle transmission period in the leading portion of the selected sub-frame. The base station apparatus 10 stores control information including information on the road-to-vehicle transmission period, etc., in a packet signal. The base station apparatus 10 also stores predetermined data in the packet signal. The base station apparatus 10 informs of the packet signal during the set road-to-vehicle transmission period.

Depending on a reception condition in which a terminal apparatus receives the packet signal from the base station apparatus 10, the first area 210 and second area 212 are formed around the communication system 100. As illustrated, the first area 210 is formed, as an area where a reception condition is relatively good, near to the base station apparatus 10. It can also be said that the first area 210 is formed near to the center portion of an intersection. On the other hand, the second area 212 is formed, as an area where a reception condition is more deteriorated than in the first area 210, outside the first area 210. Further, the outside second area 214 is formed, as an area where a reception condition is further deteriorated than in the second area 212, outside the second area 212. An error rate or a received power of the packet signal is used as the reception condition.

Each of a plurality of terminal apparatuses receives the packet signal informed by the base station apparatus 10 to presume, of the first area 210, the second area 212, and the outside second area 214, which area the terminal apparatus exists in, based on a reception condition of the received packet signal. When presuming to exist in the first area 210 or the second area 212, the terminal apparatus generates a frame based on the control information included in the received packet signal. As a result, the frame generated in each of the plurality of terminal apparatuses synchronizes with the frame generated in the base station apparatus 10. The terminal apparatus also recognizes the road-to-vehicle transmission period set by each base station apparatus 10 to specify a vehicle-to-vehicle transmission period for the transmission of a packet signal. Specifically, when the terminal apparatus exists in the first area 210, a period of priority is specified; and when the terminal apparatus exists in the second area 212, a general period is specified. Further, the terminal apparatus transmits a packet signal by performing TDMA in the period of priority and by performing CSMA/CA in the general period.

The terminal apparatus selects a sub-frame having the same relative timing also in the following frame. In particular, during the period of priority, the terminal apparatus selects a slot having the same relative timing in the following frame. Herein, the terminal apparatus acquires data to store in the packet signal. The date includes, for example, the information on an existing location. The terminal apparatus also stores control information in the packet signal. That is, the control information transmitted from the base station apparatus 10 is transferred by the terminal apparatus. On the other hand, when presuming to exist in the outside second area 214, the terminal apparatus transmits the packet signal by performing CSMA/CA, irrespective of the structure of a frame.

Figure 2:
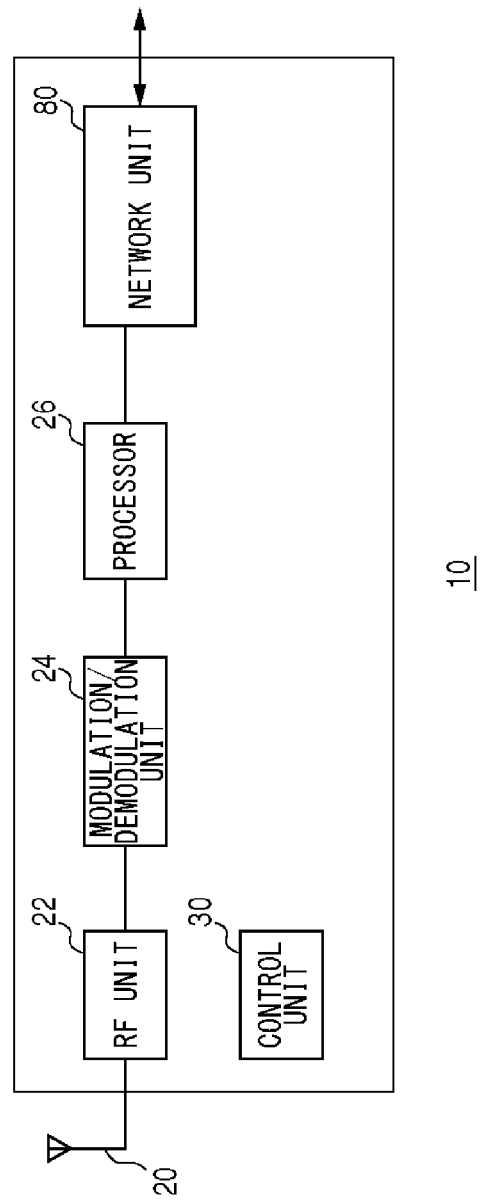
FIG. 2 is a view illustrating the structure of a base station apparatus.

FIG. 2 illustrates the structure of the base station apparatus 10. The base station apparatus 10 includes an antenna 20, an RF unit 22, a modulation/demodulation unit 24, a processor 26, a control unit 30, and a network communication unit 80. The RF unit 22 receives, as a reception process, a packet signal from a non-illustrated terminal apparatus or another base station apparatus 10 with the antenna 20. The RF unit 22 performs frequency conversion on the received packet signal having a radio frequency to generate a baseband packet signal. Further, the RF unit 22 outputs the baseband packet signal to the modulation/demodulation unit 24. Because a baseband packet signal is generally formed of an in-phase component and an orthogonal component, two signal lines should be illustrated; however, a single signal line is to be illustrated herein for the clarity of the view. The RF unit 22 also includes an LNA (Low Noise Amplifier), a mixer, an AGC, and an A/D conversion unit.

The RF unit 22 performs, as a transmission process, frequency conversion on the baseband packet signal inputted from the modulation/demodulation unit 24 to generate a packet signal having a radio frequency. Further, the RF unit 22 transmits, during the road-to vehicle transmission period, the packet signal having a radio frequency from the antenna 20. The RF unit 22 also includes a PA (Power Amplifier), a mixer, and a D/A conversion unit.

The modulation/demodulation unit 24 performs, as a reception process, demodulation on the baseband packet signal from the RF unit 22. Further, the modulation/demodulation unit 24 outputs a result of the demodulation to the processor 26. The modulation/demodulation unit 24 also performs, as a transmission process, modulation on the date from the processor 26. Further, the modulation/demodulation unit 24 outputs, as a baseband packet signal, a result of the modulation to the RF unit 22. Herein, because the communication system 100 deals with the OFDM (Orthogonal Frequency Division Multiplexing) modulation method, the modulation/demodulation unit 24 also performs FFT (Fast Fourier Transform) as a reception process, and also performs IFFT (Inverse Fast Fourier Transform) as a transmission process.

The processor 26 receives a signal from a non-illustrated GPS satellite to acquire information on time based on the received signal. A publicly-known technique is to be used for the acquisition of the information on time, and hence description will be omitted herein. The processor 26 generates a plurality of frames based on the information on time. For example, the processor 26 generates ten frames each having a period of "100 msec" by dividing a period of "1 sec" into ten pieces based on the timing indicated by the information on time. It is specified that frames are repeated by repeating such a process. Alternatively, the processor 26 may detect control information from the result of the demodulation. Such a process corresponds to generation of a frame synchronized with the timing of a frame formed by another base station apparatus 10. The details of the process by the processor 26 in the case will be described later.

FIGS. 3A to 3D illustrate the format of a frame specified in the communication system 100. FIG. 3A illustrates the structure of the frame. The frame is formed of N pieces of sub-frames indicated by a first sub-frame through an N-th sub-frame. For example, when the period of the frame is 100 msec and N is 10, a sub-frame having a period of 10 msec is specified. FIG. 3B illustrates the structure of a frame generated by a first base station apparatus 10a. The first base station apparatus 10a sets a road-to-vehicle transmission period in the leading portion of the first sub-frame. The first base station apparatus 10a also sets a vehicle-to-vehicle transmission period in the first sub-frame following the road-to-vehicle transmission period. The vehicle-to-vehicle transmission period means a period during which a terminal apparatus can inform of a packet signal. That is, it is specified that the first base station apparatus 10a can inform of a packet signal during the road-to-vehicle transmission period that has been set in the leading period of the first sub-frame and a terminal apparatus can inform of a packet signal during the vehicle-to-vehicle transmission period other than the road-to-vehicle transmission period in the frame. Further, the first base station apparatus 10a sets only the vehicle-to-vehicle transmission period in each of a second sub-frame through the N-th sub-frame.

FIG. 3C illustrates the structure of a frame generated by a second base station apparatus 10b. The second base station apparatus 10b sets a road-to-vehicle transmission period in the leading portion of the second sub-frame. The second base station apparatus 10b sets vehicle-to-vehicle transmission periods both in the subsequent stage of the road-to-vehicle transmission period in the second sub-frame and in each of the first sub-frame and a third sub-frame through the N-th frame. FIG. 3D illustrates the structure of a frame generated by a third base station apparatus 10c. The third base station apparatus 10c sets a road-to-vehicle transmission period in the leading portion of the third sub-frame. The third base station apparatus 10c also sets vehicle-to-vehicle transmission periods both in the subsequent stage of the road-to-vehicle transmission period in the third sub-frame and in each of the first sub-frame, the second sub-frame, and a fourth sub-frame through the N-th sub-frame. As stated above, each of the plurality of the base station apparatuses 10 selects a sub-frame different from those of the others to set a road-to-vehicle transmission period in the leading portion of the selected sub-frame.

FIG. 4 illustrates the structure of a sub-frame. As illustrated, a single sub-frame is structured in the order of a road-to-vehicle transmission period, a period of priority, and a general period. The period of priority and the general period correspond to the vehicle-to-vehicle transmission period illustrated in FIG. 3B, etc. When the road-to-vehicle transmission period is not included in a sub-frame, the sub-frame is structured in the order of the period of priority and the general period. In the period of priority, a plurality of slots are time division multiplexed. With such a structure, frames each including at least a plurality of slots are repeated. Description will be made, referring back to FIG. 2.

Figures 5A, 5B:
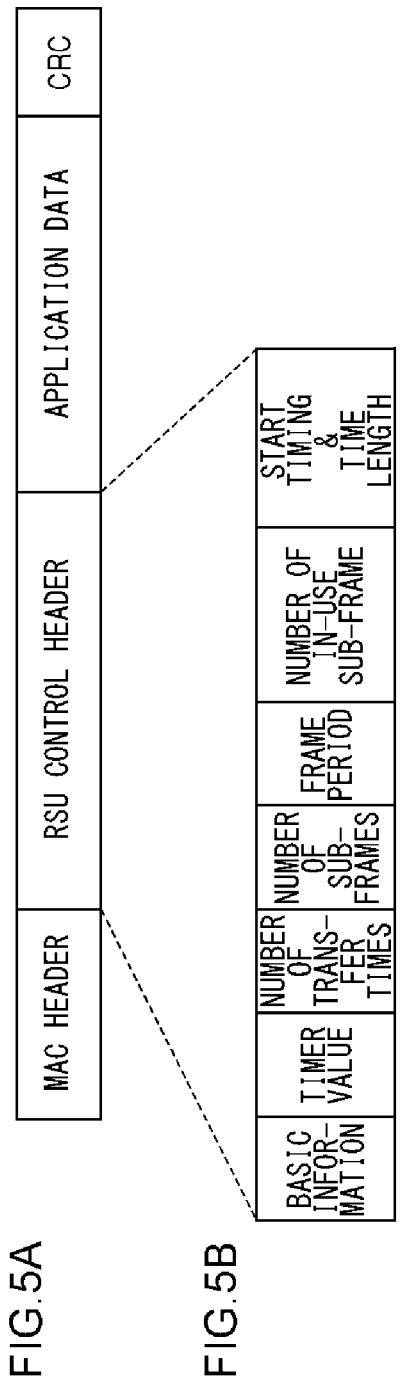
FIGS. 5A and 5B are views illustrating the format of a MAC frame stored in a packet signal specified in the communication system.

The processor 26 inputs a result of demodulation from another non-illustrated base station apparatus 10 or terminal apparatus via the RF unit 22 and the modulation/demodulation unit 24. Herein, the structure of an MAC frame to be stored in a packet signal will be described as the result of demodulation. The MAC frame to be inputted to the processor 26 and that to be outputted from the processor 26 have the same structures as each other. FIGS. 5A and 5B illustrate the format the MAC frame to be stored in a packet signal specified in the communication system 100. FIG. 5A illustrates the format of the MAC frame. In the MAC frame, an "MAC header", an "RSU control header", "application data", and a "CRC" are arranged sequentially from the head. The RSU control header corresponds to the aforementioned control information. Data to be notified to terminal apparatuses, such as accident information, are stored in the application data.

FIG. 5B illustrates the format of the RSU control header. In the RSU control header, "basic information", a "timer value", the "number of transfer times", the "number of sub-frames", a "frame period", the "number of an in-use sub-frame", and a "start timing & time length" are arranged sequentially from the head. The structure of the RSU control header is not limited to that illustrated in FIG. 5B, but part of the elements may be excluded, or another element may be included. The number of transfer times indicates the number of times at which the control information transmitted from the base station apparatus 10, in particular, the content of the RSU control header has been transferred by non-illustrated terminal apparatuses. Herein, a base station apparatus 10 with respect to the MAC frame to be outputted from the processor 26 corresponds to the present base station apparatus 10, while a base station apparatus 10 with respect to the MAC frame to be inputted to the processor 26 corresponds to another base station apparatus 10. This is common also in the following description.

The MAC frame outputted from the processor 26 is set to be "0" in the number of transfer times. The number of transfer times is set to be "0 or larger" with respect to the MAC frame inputted to the processor 26. The number of sub-frames indicates the number of sub-frames of which a single frame is formed. The frame period indicates the period of a frame, which is set, for example, to be "100 msec", as stated above. The number of an in-use sub-frame indicates the number of a sub-frame in which the base station apparatus 10 has set a vehicle-to-vehicle transmission period. As illustrated in FIG. 3A, the number of a sub-frame is set to be "1" in the head of a frame. In the start timing & time length, the start timing of a road-to-vehicle transmission period set in the head of a sub-frame and the time length of the road-to-vehicle transmission period are indicated. Description will be made, referring back to FIG. 2.

Herein, procedures for selecting a sub-frame in which a road-to-vehicle transmission period is to be set will be described. A process in which the processor 26 generates a frame synchronized with the timing of a frame formed by another base station apparatus 10 will be described. Of the MAC frames, the processor 26 extracts an MAC frame in which the number of transfer times has been set to be "0". This corresponds to a packet signal directly transmitted from another base station apparatus 10. Of the extracted MAC frame, the processor 26 specifies the value of the number of an in-use sub-frame. This corresponds to the specification of a sub-frame used by the another base station apparatuses 10. The processor 26 measures the received power of the packet signal arranged at the head of the already specified sub-frame. This correspond to the measurement of the received power of the packet signal from the another base station apparatus 10.

Of the MAC frames, the processor 26 extracts an MAC frame in which the number of transfer times has been set to be "1 or larger". This corresponds to a packet signal that has been transmitted from another base station apparatus 10 and then transferred by a terminal apparatus. Of the extracted MAC frame, the processor 26 specifies the value of the number of an in-use sub-frame. This corresponds to the specification of a sub-frame used by the another base station apparatus 10. The terminal apparatus transfers the number of a sub-frame acquired when the terminal apparatus has received the packet signal from the another base station apparatus 10.

The processor 26 also measures the received power of these packet signals. In addition, the processor 26 presumes that the acquired reception signal is the received power of a packet signal from another base station apparatus 10 whose control information has been transferred by the received packet signal. The processor 26 specifies a sub-frame in which a road-to-vehicle transmission period is to be set. Specifically, the processor 26 confirms whether "unused" sub-frames exist. When they exist, the processor 26 selects any one of the "unused" sub-frames. Herein, when a plurality of sub-frames are unused, the processor 26 selects a single sub-frame at random. When an unused sub-frame does not exist, i.e., when each of the plurality of sub-frames is used, the processor 26 preferentially specifies a sub-frame whose received power is small.

The processor 26 sets a road-to-vehicle transmission period in the leading portion of the sub-frame having the specified number of a sub-frame. The processor 26 generates an MAC frame to be stored in a packet signal. In that case, the processor 26 determines the value of the RSU control header in the MAC frame in accordance with the preset road-to-vehicle transmission period. This corresponds to the control information on the structure of a frame. The processor 26 acquires predetermined information via the network communication unit 80 to include it in the application data. Herein, the network communication unit 80 is connected to a non-illustrated network 202. The processor 26 makes the modulation/demodulation unit 24 and the RF unit 22 perform broadcast transmission of a packet signal in the road-to-vehicle transmission period. Herein, the packet signal includes control information and the identification information for identifying the present base station apparatus 10. The identification information for identifying the present base station apparatus 10 is included in the MAC header illustrated in FIG. 5A.

When information with respect to another broken base station apparatus 10 (hereinafter, referred to as "failure information") is included in the packet signal received from a terminal apparatus, the processor 26 outputs the failure information to the network communication unit 80. The network communication unit 80 notifies a non-illustrated management center of the failure information via the non-illustrated network 202. That is, the processor 26 notifies the management center of discovery of a failure. Alternatively, a result of the presumption may be included in a packet signal to be informed from the processor 26, the modulation/demodulation unit 24, or the RF unit 22. The control unit 30 controls the processes in the whole base station apparatus 10.

The structure is implemented in the hardware by any CPU of a computer, memory, and other LSI, and implemented in the software by a computer program or the like that is loaded in a memory. Herein, functional blocks implemented by the cooperation of hardware and software are depicted. Therefore, it will be obvious to those skilled in the art that these functional blocks may be implemented in a variety of manners by hardware only or any combination thereof.

Figure 6:
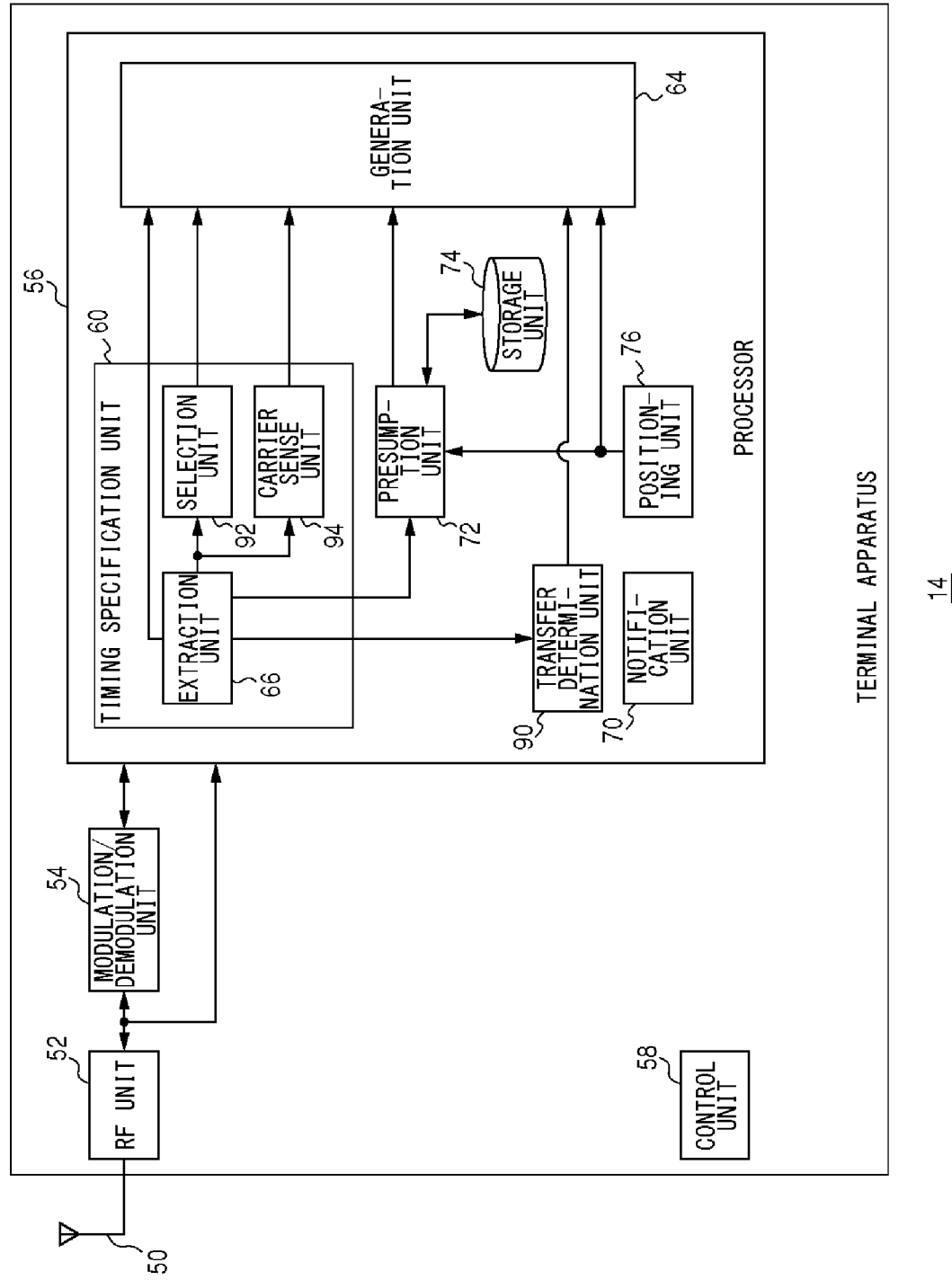
FIG. 6 is a view illustrating the structure of a terminal apparatus mounted on a vehicle.

FIG. 6 illustrates the structure of a terminal apparatus 14 mounted on the vehicle 12. The terminal apparatus 14 includes an antenna 50, an RF unit 52, a modulation/demodulation unit 54, a processor 56, and a control unit 58. The processor 56 includes a generation unit 64, a timing specification unit 60, a transfer determination unit 90, a notification unit 70, a presumption unit 72, a storage unit 74, and a positioning unit 76. The timing specification unit 60 includes an extraction unit 66, a selection unit 92, and a carrier sense unit 94. The antenna 50, the RF unit 52, and the modulation/demodulation unit 54 perform the same processes as the antenna 20, the RF unit 22, and the modulation/demodulation unit 2, which ate illustrated in FIG. 2. Therefore, description will be made herein, centered on the differences between the two groups.

The modulation/demodulation unit 54 and the processor 56 receive packet signals from another non-illustrated terminal apparatus 14 or base station apparatus 10. As stated above, there are sometimes the cases where a sub-frame in which a period of priority and a general period have been time division multiplexed is specified and a road-to-vehicle transmission period is time division multiplexed in the sub-frame. The road-to-vehicle transmission period indicates a period during which a packet signal can be informed from the base station apparatus 10. Herein, the modulation/demodulation unit 54 and the processor 56 receive a packet signal from the base station apparatus 10 in the road-to-vehicle transmission period. The packet signal includes identification information for identifying the base station apparatus 10 that originally informs of the packet signal. The period of priority means a period to be used by the terminal apparatus 14 that exists in the first area 210 formed around the base station apparatus 10, for informing of a packet signal. The period of priority includes a plurality of slots. The general period means a period to be used by the terminal apparatus 14 that exists in the second area formed outside the first area 210, for informing of a packet signal. Also, a frame in which a plurality of sub-frames have been time division multiplexed is specified.

The extraction unit 66 measures the received power of a packet signal from the base station apparatus 10. The extraction unit 66 presumes, of the first area 210, the second area 212, and the outside second area 214, which area the terminal apparatus exists in based on the measured received power. For example, the extraction unit 66 stores a first area-determination threshold value and a second area-determination threshold value. Herein, the first area-determination threshold value is specified to be larger than the second area-determination threshold value. When the received power is larger than the first area-determination threshold value, the extraction unit 66 determines that the terminal apparatus exists in the first area 210. When the received power is smaller than or equal to the first area-determination threshold value and larger than the second area-determination threshold value, the extraction unit 66 determines that the terminal apparatus exists in the second area 212. When the received power is smaller than or equal to the second area-determination threshold value, the extraction unit 66 determines that the terminal apparatus exists outside the second area 212. Alternatively, the extraction unit 66 may use an error rate instead of a received power, or may use a combination of a received power and an error rate.

The extraction unit 66 determines, as a transmission period, any one of the period of priority, the general period, and a timing irrelevant to the structure of a frame, based on the result of the presumption. Specifically, when presuming that the terminal apparatus exists in the outside second area 214, the extraction unit 66 selects the timing irrelevant to the structure of a frame. When presuming that the terminal apparatus exists in the second area 212, the extraction unit 66 selects the general period. When presuming that the terminal apparatus exists in the first area 210, the extraction unit 66 selects the period of priority.

When the result of the demodulation from the modulation/demodulation unit 54 is a packet signal from the non-illustrated base station apparatus 10, the extraction unit 66 specifies the timing of a sub-frame in which a road-to-vehicle transmission period has been arranged. The extraction unit 66 also generates a frame based on the timing of the sub-frame and the content of the RSU control header. The generation of the frame may be performed in the same way as the aforementioned processor 26, and hence description will be omitted herein. As a result, the extraction unit 66 generates a frame synchronized with the frame formed in the base station apparatus 10. The extraction unit 66 also specifies the road-to-vehicle transmission period based on the content of the RSU control header.

When selecting the period of priority, the extraction unit 66 outputs information on the period of priority to the selection unit 92. When selecting the general period, the extraction unit 66 outputs information on both the timings of the frame and sub-frame and a vehicle-to-vehicle transmission period to the carrier sense unit 94. When selecting the timing irrelevant to the structure of a frame, the extraction unit 66 directs the carrier sense unit 94 to perform a carrier sense. The selection unit 92 receives the information on the period of priority from the extraction unit 66. The selection unit 92 also selects anyone of a plurality of slots included in the period of priority to determine the selected slot as a transmission timing. Alternatively, a received power may be used herein to select a slot. For example, a slot whose received power is small is selected. The selection unit 92 notifies the generation unit 64 of the determined transmission timing.

The carrier sense unit 94 receives the information on both the timings of the frame and sub-frame and a vehicle-to-vehicle transmission period from the extraction unit 66. The carrier sense unit 94 measures an interference power by performing a carrier sense in the general period. The carrier sense unit 94 also determines a transmit timing in the general period based on the interference power. Specifically, the carrier sense unit 94 stores a predetermined threshold value in advance to compare the interference power with the threshold value. When the interference power is smaller than the threshold value, the carrier sense unit 94 determines a transmission timing. When directed by the extraction unit 66 to perform a carrier sense, the carrier sense unit 94 determines a transmission timing by performing CSMA, without taking into consideration the structure of a frame. The carrier sense unit 94 notifies the generation unit 94 of the determined transmission timing.

The positioning unit 76 includes a GPS receiver, a gyroscope, and a speed sensor, etc., which are not illustrated. The positioning unit 76 acquires, by the data supplied from these devices, the existing location, traveling direction, and traveling speed, etc., of the non-illustrated vehicle 12, i.e., the vehicle 12 on which the terminal apparatus 14 is mounted. The existing location is indicated by a latitude and a longitude. The acquisition of them can be achieved by using a publicly-known technique, and hence description will be omitted herein. The positioning unit 76 outputs the existing location, etc., to the generation unit 64.

The generation unit 64 receives the existing location, etc., from the positioning unit 76. The generation unit 64 uses the MAC frame illustrated in FIGS. 5A and 5B to store the existing location in the application data. The generation unit 64 also receives the identification information from the extraction unit 66 such that the latest-received identification information is also stored in the application data. The generation unit 64 generates a packet signal including an MAC frame and performs broadcast transmission of the generated packet signal via the modulation/demodulation unit 54, the RF unit 52, and the antenna 50, at the transmission timing determined in the selection unit 92 or the carrier sense unit 94. The transmission timing is included in a vehicle-to-vehicle transmission period.

The transfer determination unit 90 controls transfer of the RSU control header. The aforementioned extraction unit 66 extracts the RSU control header from a packet signal transmitted from the base station apparatus 10 that is said to be an information source. As stated above, when the packet signal is directly transmitted from the base station apparatus 10, the number of transfer times is set to be "0"; however, when the packet signal is transmitted from another terminal apparatus 14, the number of transfer times is set to be "1 or larger". Herein, because the number of an in-use sub-frame is not changed when transmitted by the terminal apparatus 14, a sub-frame to be used by the base station apparatus 10 that serves as an information source can be specified by referring to the number of an in-use sub-frame.

The transfer determination unit 90 acquires, for every base station apparatus 10 that serves an information source, information on the number of transfer times. Specifically, the transfer determination unit 90 sequentially acquires the numbers of transfer times each corresponding to the number of a sub-frame of "1", and subsequently performs the same process on the numbers of transfer times each corresponding to another number of a sub-frame. Of the information with respect to the number of transfer times related to the base station apparatus 10, the transfer determination unit 90 further acquires, for every base station apparatus 10 that serves as an information source, the value of the number of transfer times that is smaller than those of the others, for example, the minimum value of the number of transfer times. That is, a transfer times-number acquisition unit 110 acquires the minimum value of the number of transfer times corresponding to the number of a sub-frame of "1" and that of the number of transfer times corresponding to the number of a sub-frame of "2", etc., respectively.

The transfer determination unit 90 measures, for every base station apparatus 10 that serves as an information source, the number of extraction times of the RSU control header, i.e., the control information. The transfer determination unit 90 also selects, for every base station apparatus 10 that serves as an information source, the number of extraction times of the control information including the value of the number of transfer times acquired in the transfer determination unit 90. Specifically, the transfer determination unit 90 measures, with respect to one of the numbers of a sub-frame, the number of extraction times of the control information for every number of transfer times. As a result, for example, with respect to the number of a sub-frame of "1", the number of extraction times of the control information whose number of transfer times is "0" becomes "0"; that of the control information whose number of transfer times is "1" becomes "4"; and that of the control information whose number of transfer times is "2" becomes "6". In addition, when the acquired number of transfer times is "1", the transfer determination unit 90 selects the number of extraction times of the control information of "4", the control information including this number of transfer times.

The transfer determination unit 90 stores the number of a sub-frame, the number of transfer times, and the number of extraction times by associating them with each other. The transfer determination unit 90 also updates a storage content when the number of transfer times or that of extraction times is updated. The transfer determination unit 90 acquires the number of transfer times and that of extraction times with respect to each base station apparatus 10. The transfer determination unit 90 selects, as control information to be transferred, the control information corresponding to at least a single base station apparatus 10 based on these numbers of transfer times and extraction times. Specifically, the transfer determination unit 90 compares the numbers of transfer times with respect to a plurality of the base station apparatuses 10 followed by comparison of the numbers of extraction times. That is, the transfer determination unit selects the control information whose number of transfer times is smaller than those of the others, for example, the control information having the minimum number of transfer times, and subsequently, of the selected control information, selects the control information whose number of extraction times is larger than those of the others, i.e., the control information having the maximum number of extraction times.

As stated above, the control information having the minimum number of transfer times and the maximum number of extraction times corresponding to the minimum number of transfer times is selected by the transfer determination unit 90. It can be said that, as the number of transfer times is smaller, the control information is received nearer to the base station apparatus 10 that serves as an information source. It can also be said that, as the number of extraction times is larger, the control information is received in a situation in which a variation in a radio environment is smaller. Accordingly, it can be said that the terminal apparatus 14 selects control information from the base station apparatus 10 installed as near as possible by selecting the control information meeting the aforementioned situation.

The transfer determination unit 90 directs the generation unit 64 to generate an RSU control header based on the selected control information. When the control information is stored in the RSU control header, the transfer determination unit 90 increases the number of transfer times in the information with respect to the number of transfer times. In response to such a direction, the generation unit 64 generates the RSU control header based on the control information selected in the transfer determination unit 90, and at the time, increases the number of transfer times.

The storage unit 74 stores the location information of the base station apparatus 10 that can informs of a packet signal to be received in the RF unit 52, the modulation/demodulation unit 54, and the processor 56. Because a plurality of the base station apparatuses 10 are installed, the storage unit 74 stores a plurality of pieces of location information. The location information is indicated by a latitude and a longitude so as to be associated with a road map. Also, because the location information is indicated as digital data, the storage unit 74 is configured as a storage medium, such as a hard disk, on which digital data can be stored. Herein, for easy description, the location information is to be stored, in advance, in the storage unit 74. For example, it is preset when the terminal apparatus 14 is purchased.

The presumption unit 72 sequentially receives the positioned existing locations from the positioning unit 76. The presumption unit 72 assumes a circular area having a predetermined radius centered on the location information stored in the storage unit 74. Such an area corresponds to, for example, the first area 210 or the second area 212 illustrated in FIG. 1, but herein, corresponds to the second area. A circular area is assumed for each of a plurality of the base station apparatuses 10. The presumption unit 72 detects that the terminal apparatus exists around the base station apparatus 10 installed at the center of a circular area by detecting that the sequentially received existing locations have entered the inside of the circular area from the outside. The presumption unit 72 also detects whether a packet signal from the base station apparatus 10 is received, while the terminal apparatus is existing in the circular area. When the packet signal is received, the presumption unit 72 presumes that the base station apparatus 10 is operating normally. On the other hand, when the packet signal is not received, the presumption unit 72 presumes that the base station apparatus 10 is in a failure state. When presuming a failure of the base station apparatus, the presumption unit 72 outputs the fact to the generation unit 64 and the notification unit 70.

When receiving the result of the presumption of a failure from the presumption unit 72, the generation unit 64 stores the result of the presumption of a failure in the application data. As a result, the result of the presumption of a failure is informed in a vehicle-to-vehicle transmission period. The notification unit 70 acquires a packet signal from the non-illustrated base station apparatus 10 in a road-to-vehicle transmission period and also acquires a packet signal from another non-illustrated terminal apparatus 14 in a vehicle-to-vehicle transmission period. The notification unit 70 notifies, via a monitor or a speaker, a driver of approach of another non-illustrated vehicle 12, etc., in accordance with the content of the data stored in the packet signal. Further, when receiving the result of the presumption of a failure from the presumption unit 72, the notification unit 70 also notifies the driver of the result of the presumption. When the notification is made via a monitor, the notification unit 70 displays, in red color, the area where the base station apparatus 10 that is in a failure state is installed. Alternatively, the notification unit 70 may output, from a speaker, the fact that the base station apparatus 10 is in a failure state. The control unit 58 controls the operations of the whole terminal apparatus 14.

Subsequently, a technique for determining a traffic jam by using the vehicle-to-vehicle communication according to an embodiment of the present invention will be described. In the present embodiment, presence or absence of a traffic jam can be determined by a terminal apparatus mounted on each vehicle based only on the vehicle-to-vehicle communication. Accordingly, a traffic jam can be predicted even where a base station apparatus is not installed.

The "traffic jam" in the following description means a state in which the preset number or more of vehicles are stopped or driving at low speed for a relatively long period of time; and accordingly it is not necessarily needed to have the same definition as that of the traffic jam used in the Police Department or a road administrator, etc.

In the present embodiment, the terminal apparatus mounted on each vehicle determines a traffic jam by receiving information from other vehicles. For the determination, "road IDs" provided to map data are used.

Figure 7:
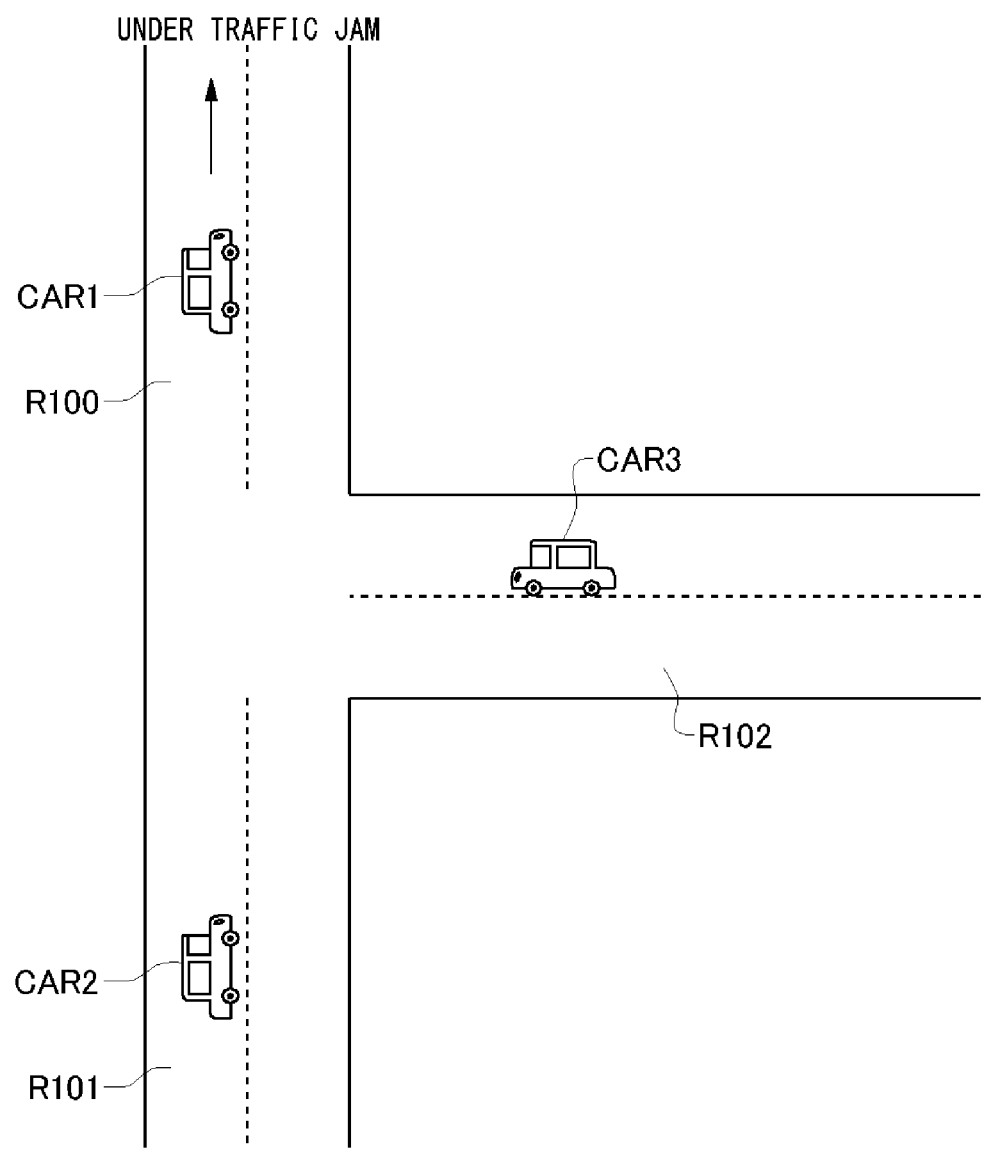
FIG. 7 is a view illustrating an example of map data in which road IDs have been provided.

FIG. 7 illustrates an example of a map image in which road IDs have been provided. FIG. 7 illustrates a T-shaped intersection that is part of a map image displayed on the display in a car navigation system, in which three pieces of road IDs, which are R 100, R 101, and R 102, are provided to the road extending upward in the view, the road extending downward, and the road extending right, respectively. Such road IDs are stored in an on-vehicle terminal apparatus along with map data. In FIG. 7, vehicles CAR 1, CAR 2, and CAR 3 are traveling on the road corresponding to the road ID of R 100, on the road corresponding to the road ID of R 101, and on the road corresponding to the road ID of R 102, respectively. In the following description, it is assumed that many road IDs, other than R 100 through R 102, are provided to map data.

One road ID is provided, for example, to every section divided by intersections or to every section divided by a preset distance. The scale of an intersection that serves as a dividing point may be as large as that of an intersection where major roads, such as national roads or prefectural roads, intersect with each other; or may be smaller than that. Other than intersections, a dividing point of a section to which a road ID is provided may be set to a position where it is considered that the predetermined number or more of vehicles are highly likely to be stopped, occurring with the position being a starting point, i.e., a position where it is considered that a traffic jam is likely to occur. For example, a dividing point may also be set to an entrance of a parking lot of a store or a place of business, which has a vehicle capacity of the predetermined number or more of vehicles. Road IDs may not be provided to all roads in map data. For example, road IDs may be provided only to roads each having a predetermined or larger width or to roads each having the predetermined number or more of passing vehicles per unit time.

A section to which a road ID is provided may be determined manually, or determined automatically on certain map data by setting a specific condition. It is preferable that the length of a section to which a road ID is provided is determined based on rules of thumb, experiments, or traffic engineering such that detailed traffic information is transmitted to drivers and the section is not unnecessarily subdivided.

The symbol of a road ID may be, for example, a consecutive number or a combination of the map number of a specific area and the consecutive number in the area. Road IDs are not limited to these, as far as they are symbol strings according to a certain form. Alternatively, the road IDs may not be displayed on a map.

By using map data in which the aforementioned road IDs have been set, it becomes possible to predict traffic jams in sections more detailed than prior arts and to provide the information of the predicted traffic jams to drivers.

Figure 8:
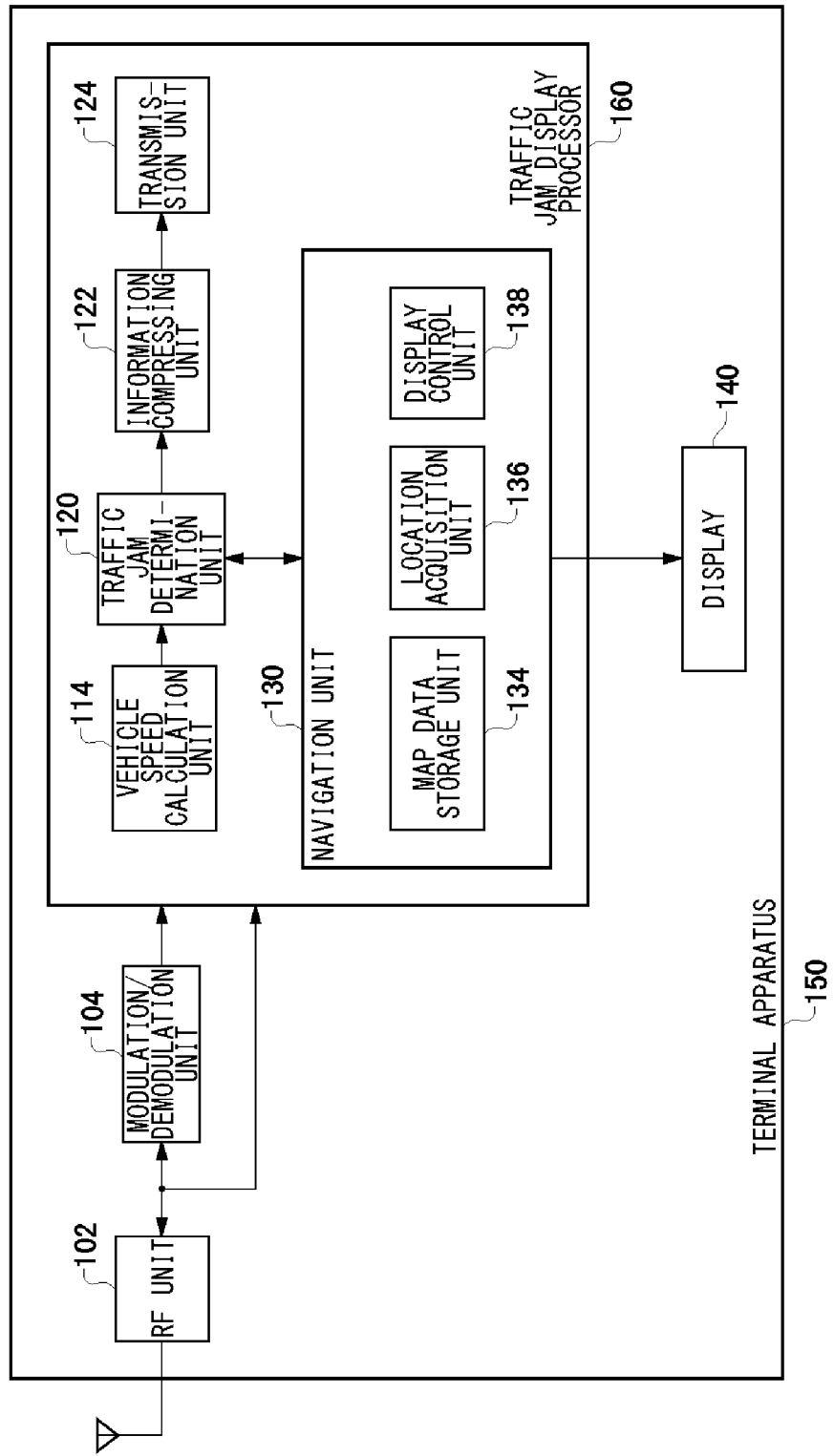
FIG. 8 is a view illustrating the structure of a terminal apparatus according to the present embodiment.

FIG. 8 illustrates the structure of a terminal apparatus 150 according to the present embodiment. Each functional block in the structure can also be implemented in various forms by only hardware or by a combination of hardware and software.

An RF unit 102 and a modulation/demodulation unit 104 respectively have the same functions as those described with respect to the aforementioned terminal apparatus 14.

A traffic jam display processor 160 receives vehicle data from other vehicles including at least both the road IDs that have been allocated in advance to the road sections in which the other vehicles are traveling and traveling speed, and determines presence or absence of a traffic jam to display on the screen of a display 140. The traffic jam display processor 160 includes a vehicle speed calculation unit 114, a traffic jam determination unit 120, an information compressing unit 122, a transmission unit 124, and a navigation unit 130.

The vehicle speed calculation unit 114 calculates the traveling speed of a vehicle (not illustrated) on which the terminal apparatus 150 is mounted. The traveling speed may be calculated by using the information from a well-known vehicle speed sensor installed on the vehicle or calculated from a travel distance of the driver's vehicle location coordinate within a predetermined period of time, the travel distance being acquired from a GPS.

The traffic jam determination unit 120 determines presence or absence of a traffic jam in front of the driver's vehicle and on the surrounding roads, based on both the vehicle data of the other vehicles that have been received in the vehicle-to-vehicle communication (hereinafter, referred to as "other vehicle data") and the vehicle data of the driver's vehicle (hereinafter, referred to as "driver's vehicle data"). By basically referring to relevant traveling speed for every road ID included in other vehicle data and driver's vehicle data, the traffic jam determination unit 120 determines that the section corresponding to the road ID is congested when the traveling speed is lower than or equal to predetermined speed. This predetermined speed may be changed in accordance with the type of a road (for example, 20 km/h for a general road and 40 km/h for an expressway, etc.).

It is preferable that, when receiving a plurality of pieces of other vehicle data each including the same road ID, the traffic jam determination unit 120 determines presence or absence of a traffic jam by performing statistical processing of the traveling speed to calculate single traveling speed for every road ID. The statistical processing may be one in which, for example, the average value or median value of the traveling speed is calculated. Because the vehicles, traveling in the same section, travel at various traveling speed, such as a vehicle traveling at high speed, a vehicle traveling at low speed, and a vehicle stopped at a red signal, it becomes possible to accurately determine presence or absence of a traffic jam by performing such statistical processing.

The transmission unit 124 generates a transmission frame including both the driver's vehicle data and all or parts of the received other vehicle data. The driver's vehicle data includes both the road ID of a section in which the driver's vehicle is traveling and the traveling speed thereof (see FIG. 9). The road ID of a section in which the driver's vehicle is traveling can be calculated by overlapping the location of the driver's vehicle acquired in a location acquisition unit 136 onto the map data stored in the later-described map data storage unit 134. When the transmission unit 124 generates the aforementioned transmission frame, the information compressing unit 122 deletes the information unnecessary for the determination of a traffic jam to compress a data amount of the transmission frame. Thereby, vehicle-to-vehicle communication traffic can be reduced.

More specifically, the information compressing unit 122 receives a result of the determination of a traffic jam for every road ID from the traffic jam determination unit 120; subsequently deletes, from the transmission frame, the traveling speed related to the road ID that has been determined not to be congested. That is, a road ID is only transmitted in the driver's vehicle data or other vehicle data of the vehicles traveling in the section corresponding to the road ID that has been determined not to be congested. The reason why a road ID is transmitted even when determined not to be congested is as follows: that is, if no information is transmitted with respect to a section that has been determined not to be congested, a terminal apparatus mounted on each vehicle cannot distinguish a fact that information is not transmitted because there is no vehicle travelling in the section from a fact that information is not transmitted because there is no traffic jam. The fact that there is no traffic jam in the corresponding section can be clearly communicated by transmitting a road ID. Also, by transmitting only the road ID of a certain section, an amount of the information to be transmitted or received can be reduced, thereby allowing the communication traffic to be reduced.

The transmission unit 124 performs broadcast transmission of a packet including the transmission frame compressed by the information compressing unit 122 to the terminal apparatuses mounted on an unspecified majority of vehicles via a well-known wireless LAN (Local Area Network).

As stated above, a terminal apparatus mounted on each vehicle determines presence or absence of a traffic jam for every road ID based on other vehicle data received from other vehicles and driver's vehicle data, and performs broadcast transmission of the driver's vehicle data and the other vehicle data after deleting unnecessary information. Because the vehicle data are transmitted in a multi-hop method, they can be transmitted even to a vehicle located at a location beyond the transmission range of a single terminal apparatus. In this case, if the upper limit number of hop times is set, an amount of vehicle data is not continued to increase in the vehicle-to-vehicle communication.

When information on traveling speed is not included in the received other vehicle data (i.e., road IDs are only included), the traffic jam determination unit 120 may allot preset traveling speed to the other vehicle data to perform the aforementioned statistical processing. Because the vehicle data not including information on traveling speed is related to a vehicle that is determined not to be stuck in a traffic jam, the aforementioned predetermined speed (for example, 20 km/h for a general road and 40 km/h for an expressway), used in determining a traffic jam, or a value larger than that is selected as the traveling speed to be allotted.

It is preferable that the transmission unit 124 integrates other vehicle data each having the same road ID, the vehicle data being received from a plurality of other vehicles, into one piece of data. When the other vehicle data have only a road ID, the single road ID would be simply included in a transmission frame. When the other vehicle data have a road ID and traveling speed, both the single road ID and a value acquired by statistical processing of the traveling speed (for example, the average value or median value) would be included in a transmission frame. Thereby, a data amount of the transmission frame can be further reduced. Accordingly, vehicle-to-vehicle communication traffic can be reduced.

The navigation unit 130 displays a navigation screen on the display 140. The navigation unit 130 includes a map data storage unit 134, a location acquisition unit 136, and a display control unit 138.

The map data storage unit 134 stores the map data used in the navigation display and traffic jam information display. The map data may be updated by an external server connected by a wireless LAN. Further, the map data storage unit 134 also stores the data of a road ID that has been allocated in advance.

The location acquisition unit 136 is, for example, a GPS (Global Positioning System), and acquires the current location of a driver's vehicle. Because a GPS is a well-known technique, detailed description will be omitted. Alternatively, the current location may be acquired by using another existing technique in which a location is specified based on wireless communication, instead of a GPS. By comparing the acquired current location of a driver's vehicle with the map data, the information compressing unit 122 and the transmission unit 124 can know the road ID of a section in which the driver's vehicle is traveling.

The display control unit 138 displays, on the display 140, a map image within a predetermined range around the driver's vehicle, based on the map data. Further, the display control unit 138 displays traffic jam information based on both a result of the determination of a traffic jam for every road ID, which has been made by the traffic jam determination unit 120, and the road ID data stored in the map data storage unit 134. For example, of the roads existing in a direction in which a driver's vehicle travels, the display control unit 138 may provide a sign indicating a traffic jam to the road corresponding to the road ID that has been determined to be congested by the traffic jam determination unit 120. This sign may be signals, such as "x" and "°", the former being provided to a road that is congested and the latter to roads other than that; or may be a red line or arrow extending across the whole section corresponding to a road ID.

The terminal apparatus 150 according to the present embodiment may be structured integrally with the terminal apparatus 14 described with reference to FIG. 6 by sharing an RF unit and a modulation/demodulation unit, etc.; or may be structured as a different apparatus.

FIG. 9 illustrates the basic structure of a frame to be transmitted or received in the vehicle-to-vehicle communication. As illustrated, this frame includes driver's vehicle data and other vehicle data received from other vehicles that exist around the driver's vehicle. Because a packet including this frame is transmitted between vehicles in a multi-hop method, the vehicle data of the driver's vehicle can be transmitted even to a vehicle located outside a transmission range (for example, a vehicle traveling at a position that is backward and far away from the driver's vehicle). The driver's vehicle data and other vehicle data include the road ID of a section in which each vehicle is traveling and the traveling speed, respectively. The aforementioned frame may include a traveling direction of a vehicle and a flag indicating presence or absence of traveling speed, etc.

Figure 3:
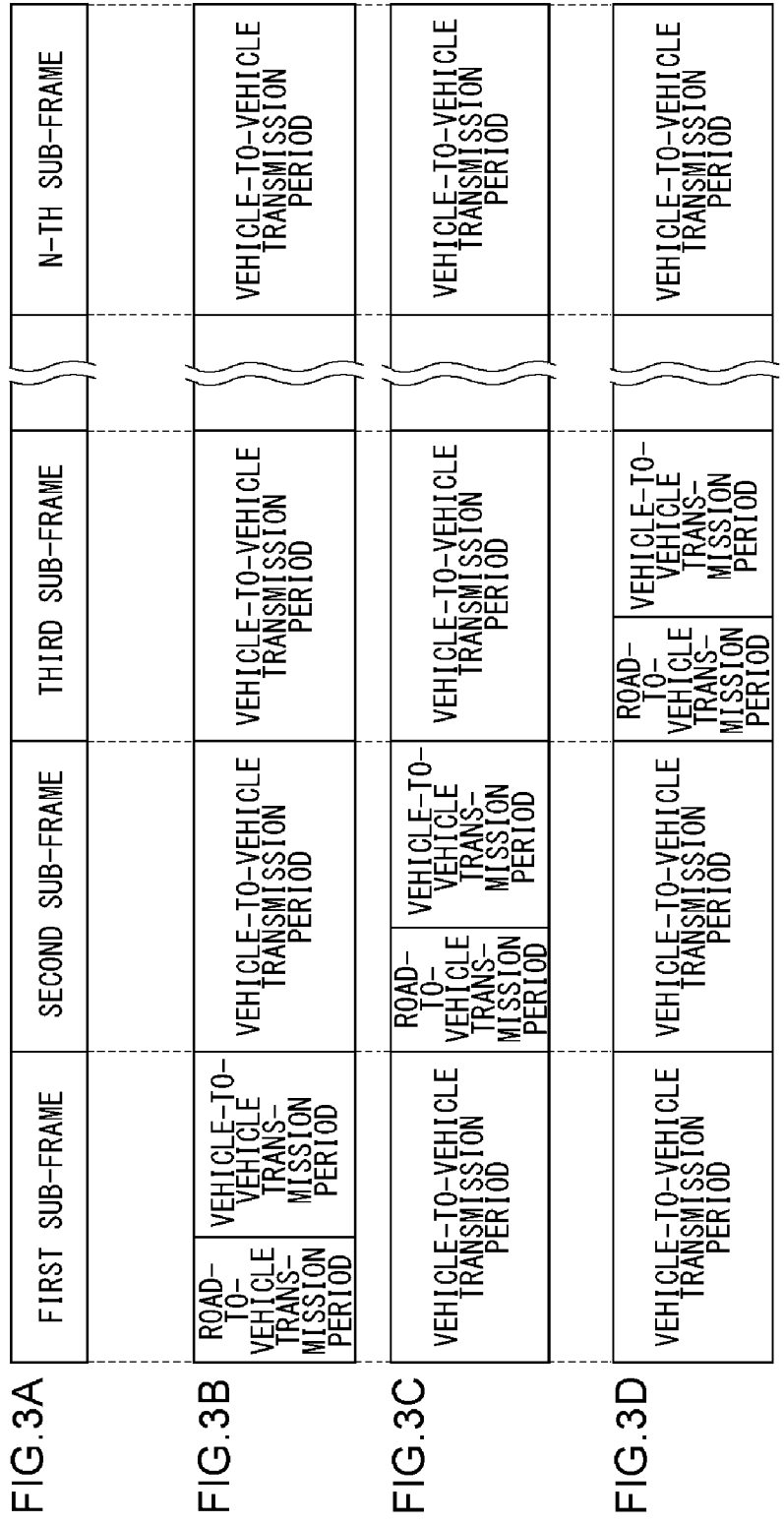
FIGS. 3A to 3D are views illustrating the format of a frame specified in the communication system.

At a place where the base station apparatus 10 is installed, the vehicle-to-vehicle communication may be performed during the vehicle-to-vehicle transmission period described with reference to FIG. 3. At a place where the base station apparatus 10 is not installed, the vehicle-to-vehicle communication may be performed by using an access control function called CSMA/CA (Carrier Sense Multiple Access with Collision Avoidance) in a wireless LAN (Local Area Network) in accordance with the specification of IEEE 802.11, etc.

FIGS. 10A to 10D illustrate examples in each of which the data of a transmission frame is compressed by the information compressing unit 122. In the present embodiment, compression of the frame data may be performed on either transmitting vehicle side or receiving vehicle side.

Figure 10:
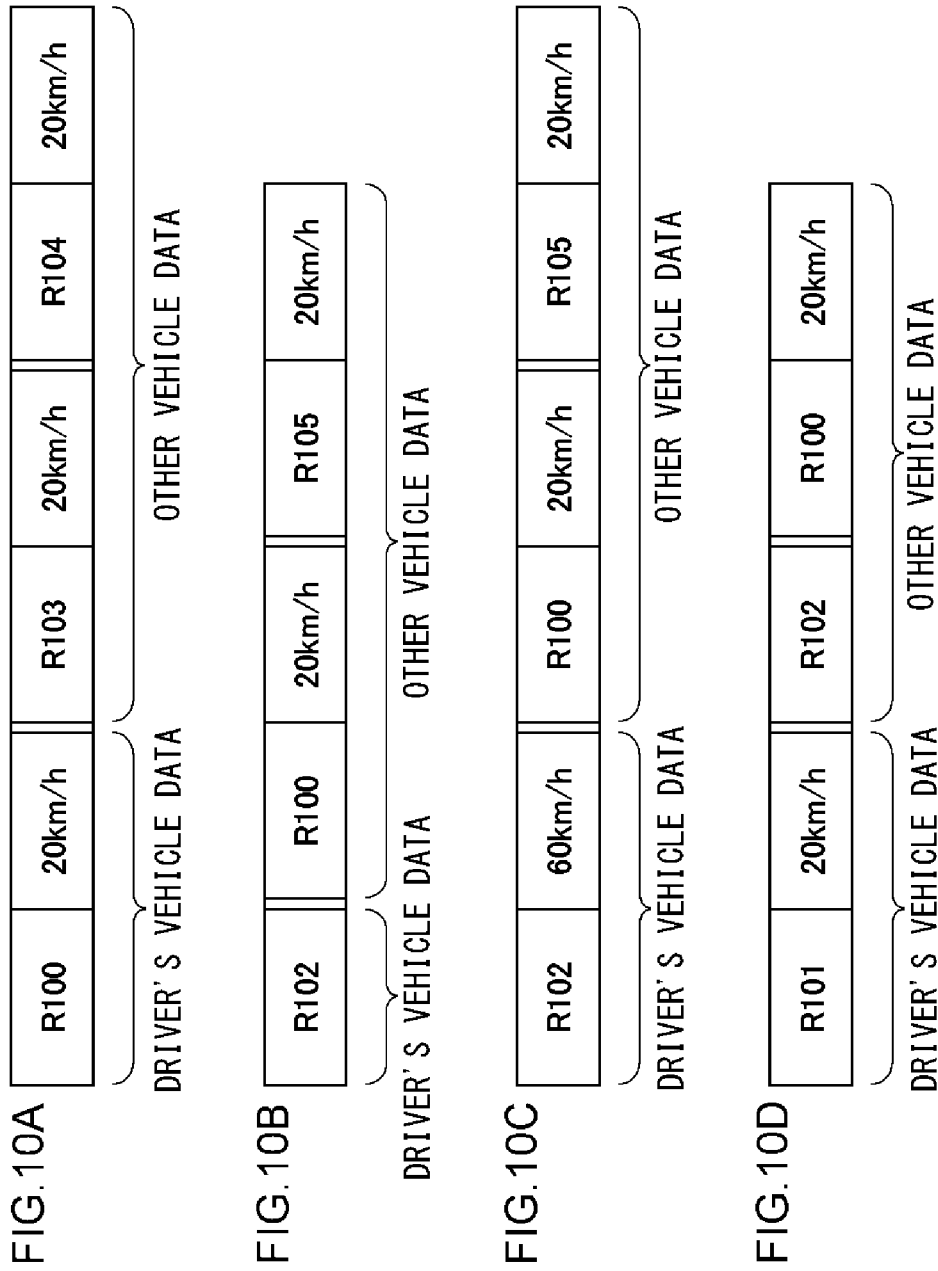
FIGS. 10A to 10D are views illustrating examples in each of which the data of a transmission frame is compressed by an information compressing unit.

FIG. 10A illustrates an example of a frame in which data is not compressed. In FIG. 10A, each of the driver's vehicle data and the other vehicle data is determined to be congested (20 km/h or lower), and hence deletion of the traveling speed by the information compressing unit 122 is not performed.

FIG. 10B illustrates an example in which data is compressed on the transmitting vehicle side. Referring to FIG. 7, it is assumed that a vehicle CAR 3 is travelling, at 60 km/h, in the section indicated by the road ID of R 102. In this case, the traffic jam determination unit 120 in the terminal apparatus mounted on the vehicle CAR 3 determines that the section corresponding to the road ID of R 102 is not congested. Accordingly, the information compressing unit 122 deletes the information on traveling speed in the driver's vehicle data, so that the road ID is only included.

FIGS. 10C and 10D illustrate examples in each of which data is compressed on the receiving vehicle side. Referring to FIG. 7, FIG. 10C illustrates a frame received, by a vehicle CAR 2 traveling in the section indicated by the road ID of R 102, from a vehicle CAR 3 traveling in a section indicated by the road ID of R 102, while FIG. 10D illustrates a frame transmitted by the vehicle CAR 2. In this case, the traffic jam determination unit 120 in the terminal apparatus mounted on the vehicle CAR 2 determines the section corresponding to the road ID of R 102 is not congested. Accordingly, the information compressing unit 122 deletes the information on traveling speed in the other vehicle data related to R 102, so that the road ID is only included.

Figure 11:
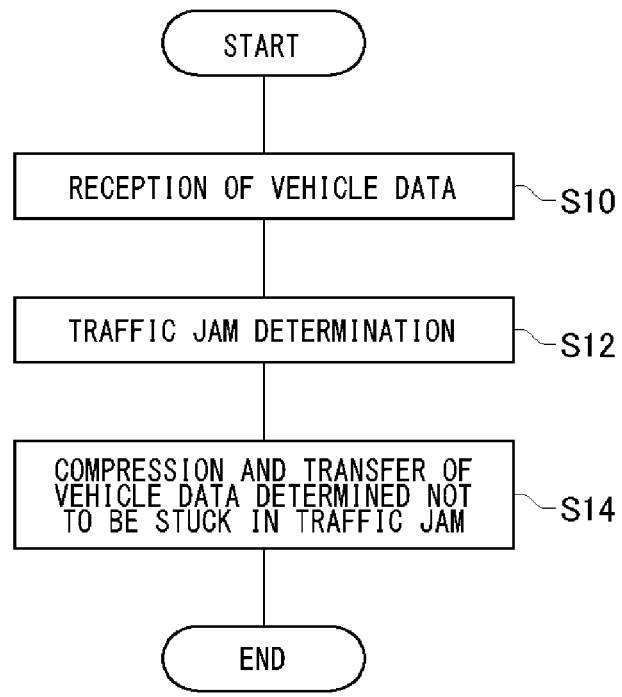
FIG. 11 is a flowchart of a vehicle-to-vehicle communication process according to the present embodiment.

FIG. 11 is a flowchart of a vehicle-to-vehicle communication process according to the present embodiment. The terminal apparatus 150 mounted on each vehicle receives other vehicle data transmitted from other vehicles (S10). The traffic jam determination unit 120 determines presence or absence of a traffic jam for every road ID, based on the received other vehicle data and driver's vehicle (S12). This process will be described later with reference to FIG. 12. With respect to the road ID that has been determined not to be congested by the traffic jam determination unit 120, the information compressing unit 122 deletes the relevant information on traveling speed from a frame including the other vehicle data and the driver's vehicle data, so that broadcast transmission of the frame is performed by the transmission unit 124 (S14). When determined not to be congested by this process, a road ID is only transmitted as vehicle data, thereby allowing communication traffic to be reduced.

Figure 12:
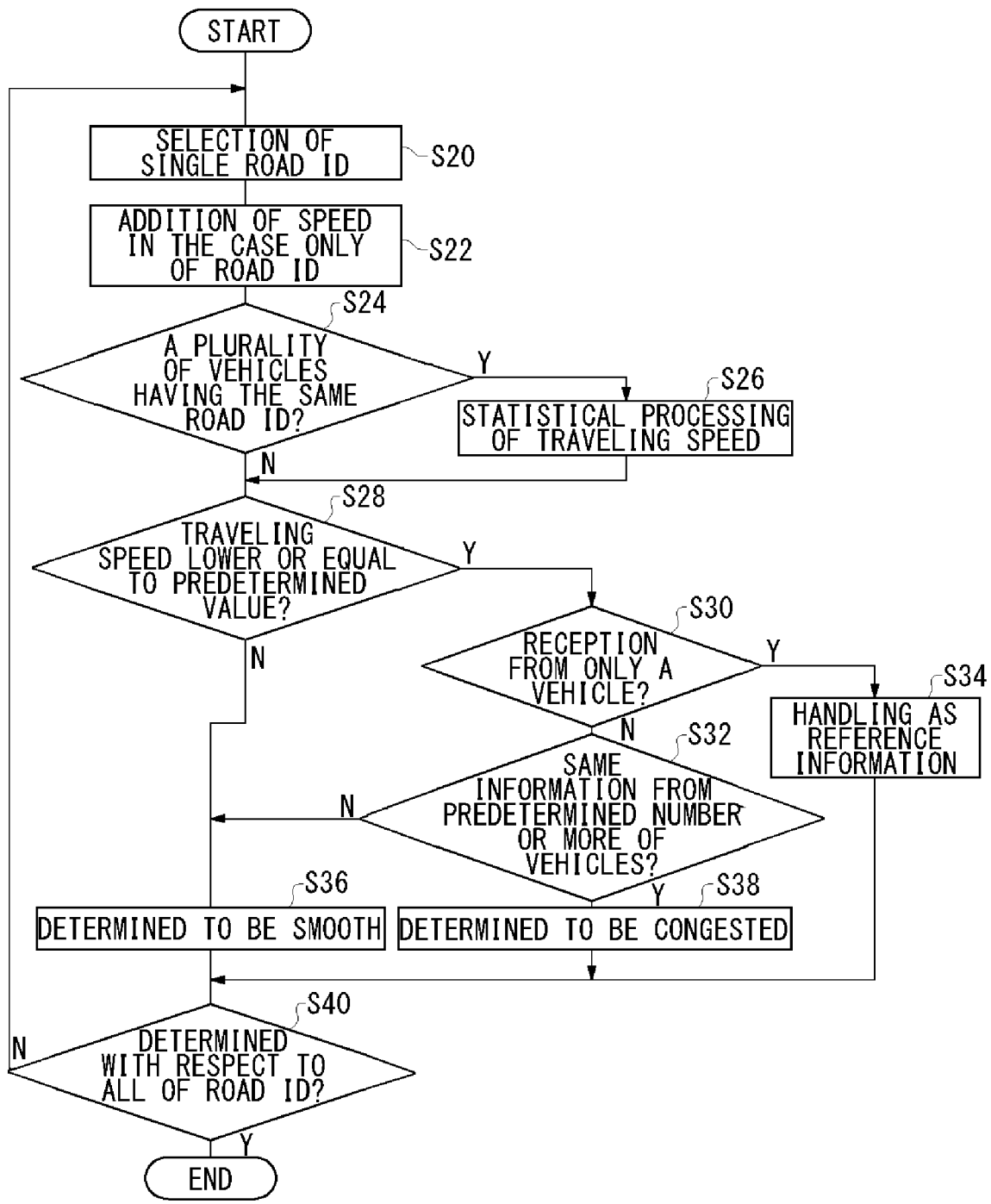
FIG. 12 is a flowchart of a traffic jam determination process in a traffic jam determination unit.

FIG. 12 is a flowchart of a traffic jam determination process in the traffic jam determination unit 120. The traffic jam determination unit 120 first selects any one of the road IDs included in the received other vehicle data of a plurality of vehicles and the driver's vehicle data (S20). When the selected road ID does not include information on traveling speed, i.e., the corresponding section is not congested, the traffic jam determination unit 120 adds preset traveling speed (S22). This step may not be performed when the number of the other vehicle data having the road ID selected in S20 is one.

Subsequently, the traffic jam determination unit 120 determines whether there are a plurality of pieces of the other vehicle data having the road ID selected in S20, i.e., whether the other vehicle data have been received from a plurality of vehicles traveling on the road corresponding to the selected road ID (S24). When the other vehicle data have been received from a plurality of vehicles (S24/Y), statistical processing of the traveling speed of all the vehicles is performed (S26). For example, the average speed is calculated, or the median value of the speed is selected.

When the number of the other vehicle data having the selected road ID is one (S24/N), the traffic jam determination unit 120 determines whether the traveling speed of the vehicle is lower than or equal to a predetermined value (S28). When the statistical processing in S26 has been performed, the traffic jam determination unit 120 determines whether the traveling speed acquired by the statistical processing is lower than or equal to a predetermined value. When the traveling speed is higher than the predetermined value (S28/N), the traffic jam determination unit 120 determines that the traffic in the section corresponding to the road ID travels smoothly (S36).

When the traveling speed is lower than or equal to the predetermined value in S28 (S28/Y), it may be immediately determined to be congested; in actual road situations, however, there are cases where it cannot be said to be congested even if the traveling speed of a vehicle is lower or equal to a predetermined value. Accordingly, exception processing that is described below is performed in the present embodiment.

The traffic jam determination unit 120 determines whether the received other vehicle data has been transmitted only from one other vehicle (S30). When one piece of other vehicle data is received (S30/Y), the determination of a traffic jam in the corresponding section is handled as reference information (S34). When the determination is handled as reference information, for example, the display control unit 138 may change a display mode from usual, in which a red arrow indicating the traffic jam on the map on the display 140 is changed to a dotted line, etc. Alternatively, a sign indicating the traffic jam may not be displayed on the map so as not communicate to a driver. The S30 step is used for excluding, for example, a situation in which one vehicle is stopped in the section corresponding to the road ID because of rest or failure, or a situation in which only one vehicle is traveling at low speed for some reason.

When a plurality of pieces of other vehicle data are received (S30/N), the traffic jam determination unit 120 determines whether the same data are received from the predetermined number or more of vehicles (S32). In other words, it is determined that the traveling speed before the statistical processing of S26 is within a preset variation range. It is preferable that this variation range is determined based on threshold values for determining a traffic jam, such as 5 km/h for a general road that is determined to be congested when traveling speed is lower than or equal to 20 km/h and 10 km/h for an expressway that is determined to be congested when traveling speed is lower than or equal to 40 km/h. The aforementioned predetermined number or more of vehicles is set to be the lower limit of vehicles that should be determined to be a traffic jam. This step is performed in order not to determine a situation in which, for example, several vehicles or so are traveling at low speed as a traffic jam.

When the same vehicle data are received only from vehicles whose number is smaller than the predetermined number (S32/N), the traffic jam determination unit 120 determines that the traffic in the section corresponding to the road ID travels smoothly (S36). When the same vehicle data are received from the predetermined number or more of vehicles (S32/Y), the traffic jam determination unit 120 determines that the section corresponding to the road ID is congested (S38).

Finally, the traffic jam determination unit 120 determines whether the determination of a traffic jam has been performed on all of the road IDs (S40). When a road ID on which the determination of a traffic jam has not been performed exists (S40/Y), this flow returns to S20. When the determination has been performed on all of the road IDs (S40/Y), this flow ends.

As described above, according to the present embodiment, presence or absence of a traffic jam can be determined only by vehicle-to-vehicle communication even at a place where a road-side device is not installed. Accordingly, a reduction in the cost for installing road-side devices and real-time determination of a traffic jam can be achieved. Also, vehicle data is transferred between vehicles in a multi-hop method, and hence the information of a vehicle that exists far away from a driver's vehicle can be received. Thereby, determination of a traffic jam in a wide range can be achieved.

Also, an amount of data to be transmitted between vehicles is compressed by deleting, in a terminal apparatus mounted on each vehicle, the information on the traveling speed of a vehicle traveling in a section that has been determined not to be congested, and hence communication traffic can be reduced and the efficiency of using frequencies can be improved. Further, a road ID is also transmitted with respect to the section that has been determined not to be congested, and hence the case where a vehicle traveling in the section does not exist can be distinguished from the case where a traffic jam does not occur although vehicles exist.

The present invention includes the following embodiments. A terminal apparatus to be mounted on a vehicle to perform vehicle-to-vehicle communication, the terminal apparatus including: a map data storage unit configured to hold map data in which a road ID is allocated, as identification information, to every preset section of at least part of roads; a traffic jam determination unit configured to determine whether the section corresponding to every road ID is congested or not by receiving vehicle data from a vehicle that is traveling in the section, the vehicle data including the road ID and the traveling speed of the vehicle; and a transmission unit configured to form and transmit a frame in which the received vehicle data of other vehicle and that of a driver's vehicle are combined. According to this embodiment, it becomes possible, by using a road ID allocated to a section set in the map data, to determine whether the road corresponding to every road ID is congested.

The present invention has been described above based on some embodiments. These embodiments are intended solely for the purpose of illustration, and it should be understood by those skilled in the art that various modifications are possible in combining those various components and various processing and those modifications also fall in the scope of the present invention. Hereinafter, such a modification will be described.

In the above embodiments, it has been described that determination of a traffic jam is performed based on the traveling speed of a vehicle. Instead, or in conjunction with this, determination of a traffic jam may be performed based on a density of vehicles. When a plurality of pieces of other vehicle data each having the same road ID are received, the traffic jam determination unit calculates a vehicle density in the section corresponding to the road ID, i.e., the number of vehicles per unit distance. The vehicle density can be calculated by the equation of (the number of other vehicle data each having the same road ID)/(actual distance of the section corresponding to the road ID). When the vehicle density is larger than or equal to a predetermined threshold value, the traffic jam determination unit determines that the section corresponding to the road ID is congested. The threshold value of a vehicle density may be a fixed value determined with the average distance of the sections to which road IDs have been allocated being taken into consideration, or may be a variable value in accordance with the actual distance of the section corresponding to a road ID.

When the terminal apparatuses according to the aforementioned embodiment are not fully spread, a vehicle density cannot be accurately calculated because only part of vehicle data are communicated between vehicles. Accordingly, the terminal apparatus may be structured in such a way that the determination of a traffic jam based on traveling speed is made to be a default setting and the determination thereof based on a vehicle density can be added at the time of a setting change or version up of software, etc., when the terminal apparatuses are spread.

What is claimed is:

1. A terminal apparatus to be mounted on a vehicle to perform vehicle-to-vehicle communication, comprising:
   a transmission unit configured to form and transmit a frame in which vehicle data received from a terminal apparatus mounted on other vehicle and vehicle data of a driver's vehicle are combined, the vehicle data of the driver's vehicle including both a road ID of a road on which the driver's vehicle is traveling and traveling speed, by referring to map data in which a road ID is allocated, as identification information, to every preset section of at least part of roads;
   a traffic jam determination unit configured to determine whether the section corresponding to the every road ID is congested; and
   an information compressing unit configured to delete traveling speed from the frame with respect to a section that has been determined not to be congested by the traffic jam determination unit.

2. The terminal apparatus according to claim 1, wherein, when the section in which the driver's vehicle is traveling is determined not to be congested by the traffic jam determination unit, the information compressing unit deletes the traveling speed from the vehicle data of the driver's vehicle of which the frame is composed.

3. The terminal apparatus according to claim 1, wherein, when the section in which other vehicle is traveling is determined not to be congested by the traffic jam determination unit, the information compressing unit deletes the traveling speed from the vehicle data of the other vehicle of which the frame is composed.

4. The terminal apparatus according to claim 1, wherein
the transmission unit integrates vehicle data each having the same road ID, the vehicle data being received from a plurality of other vehicles, into one piece of data.

5. The terminal apparatus according to claim 1, wherein the at least part of roads includes a road having a predetermined or larger width or a road having the predetermined number or more of passing vehicles per unit time.

6. The terminal apparatus according to claim 1, wherein when a plurality of pieces of vehicle data each including the same road ID are received from other vehicles, the traffic jam determination unit determines presence or absence of a traffic jam by performing statistical processing of the traveling speed included in the plurality of pieces of vehicle data to calculate single traveling speed for every road ID.

7. The terminal apparatus according to claim 6, wherein, when traveling speed are not included in the received vehicle data of other vehicles, the traffic jam determination unit allots traveling speed that have been set in advance to the road ID included in the vehicle data to perform the statistical processing.

\* \* \* \* \*